(12) United States Patent
Schoendeling et al.

(10) Patent No.: US 10,374,501 B2
(45) Date of Patent: Aug. 6, 2019

(54) COMMUTATOR MOTOR, METHOD FOR PRODUCING A COMMUTATOR MOTOR, AND WINDSCREEN-WIPER MOTOR

(71) Applicant: Valeo Systèmes d'Essuyage, Le Mesnil Saint Denis (FR)

(72) Inventors: Matthias Schoendeling, Bietigheim-Bissingen (DE); Markus Stubbe, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 274 days.

(21) Appl. No.: 15/529,563

(22) PCT Filed: Dec. 9, 2015

(86) PCT No.: PCT/EP2015/079169
§ 371 (c)(1),
(2) Date: May 25, 2017

(87) PCT Pub. No.: WO2016/091979
PCT Pub. Date: Jun. 16, 2016

(65) Prior Publication Data
US 2017/0324314 A1    Nov. 9, 2017

(30) Foreign Application Priority Data

Dec. 9, 2014   (DE) .................. 10 2014 118 185

(51) Int. Cl.
*H02K 3/28*        (2006.01)
*H02K 23/26*       (2006.01)
(Continued)

(52) U.S. Cl.
CPC ............... *H02K 23/26* (2013.01); *H02K 3/28* (2013.01); *H02K 15/085* (2013.01); *H02K 23/30* (2013.01); *H02K 23/40* (2013.01)

(58) Field of Classification Search
CPC ........ H02K 23/26; H02K 23/30; H02K 23/40; H02K 3/28; H02K 15/085
(Continued)

(56) References Cited

U.S. PATENT DOCUMENTS 4,541,575 A    9/1985  Dickerson
7,388,312 B2 * 6/2008  Hyodo .................... H02K 3/28
                                                    310/130
(Continued)

OTHER PUBLICATIONS

International Search Report issued in corresponding application No. PCT/EP2015/079169 dated Feb. 16, 2016 (2 pages).
(Continued)

*Primary Examiner* — Jeremy A Luks
(74) *Attorney, Agent, or Firm* — Osha Liang LLP

(57) ABSTRACT

The invention relates to a commutator motor (10), particularly as part of a windscreen-wiper motor (100), having at least four magnet elements (11 to 14) which are arranged on a reference-circle diameter around an axis of rotation of an armature shaft (2) with polarity that alternates in the circumferential direction, and having an armature (15) with armature slots (N1 to N18) and armature teeth (Z1 to Z18), wherein winding wires (20) having a multiplicity of windings (27, 28) in each case for constructing coils (C1 to C9) are arranged in the armature slots (N1 to N18), wherein a start (21) and an end (22) of a winding wire (20) is electrically conductively connected to a commutator hook (H1 to H18) in each case, wherein a winding wire (20) has two winding-wire sections (25, 26), which are arranged in the region of different magnet elements (11 to 14) in such a manner that a first winding-wire section (25) with a first number of windings (27) in a first winding direction is assigned to a first magnet element (11 to 14) and is located in two armature slots (N1 to N18), and that a second winding-wire section (26) with a second number of wind- (Continued)

Figure 1:
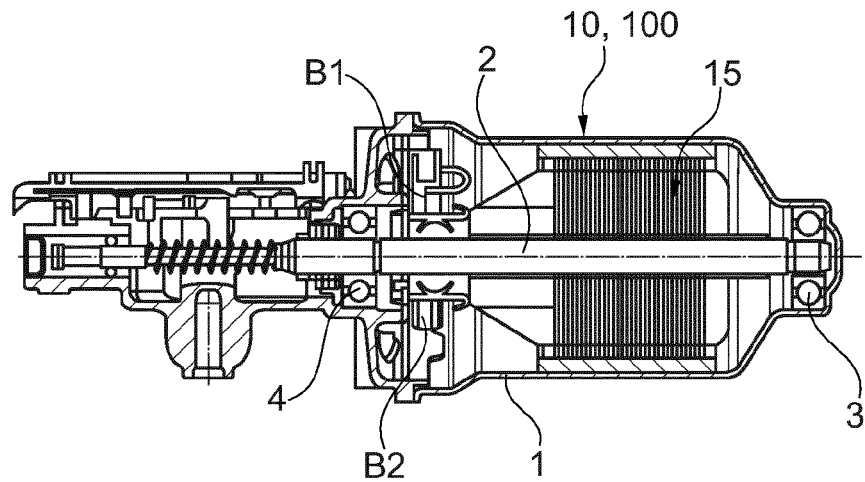

ings (28) in a second winding direction, opposite to the first winding direction, is assigned to a second magnet element (11 to 14) and is located in two armature slots (N1 to N18), and wherein the two magnet elements (11 to 14) have different polarities.

9 Claims, 2 Drawing Sheets

(51) Int. Cl.
*H02K 23/30* (2006.01)
*H02K 23/40* (2006.01)
*H02K 15/085* (2006.01)

(58) Field of Classification Search
USPC ........ 310/184–185, 198, 219, 224, 233, 234
See application file for complete search history.

(56) References Cited

U.S. PATENT DOCUMENTS

| | | | |
|---|---|---|---|
| 7,557,484 B2 * | 7/2009 | Kawashima | H02K 23/20 310/198 |
| 8,378,547 B2 | 2/2013 | Sakata et al. | |
| 8,604,662 B2 * | 12/2013 | Ishikawa | H02K 1/17 310/234 |
| 8,618,712 B2 * | 12/2013 | Saito | H02K 13/10 310/238 |
| 8,941,283 B2 * | 1/2015 | Saito | H02K 13/10 310/233 |
| 2014/0265712 A1 | 9/2014 | Magnetti et al. | |

OTHER PUBLICATIONS

Written Opinion of the International Searching Authority issued in corresponding application No. PCT/EP2015/079169 dated Feb. 16, 2016 (6 pages).

* cited by examiner

COMMUTATOR MOTOR, METHOD FOR PRODUCING A COMMUTATOR MOTOR, AND WINDSCREEN-WIPER MOTOR

PRIOR ART

The invention relates to a commutator motor in accordance with the preamble of claim 1. Furthermore, the invention relates to a method for producing a commutator motor according to the invention, and to a wind-screen-wiper motor which has a commutator motor according to the invention.

A commutator motor in accordance with the preamble of claim 1 and a method for producing a commutator motor of this type are known from U.S. Pat. No. 8,378,547 B2. The known commutator motor has four magnet elements which are arranged on a reference-circle diameter around an axis of rotation of an armature shaft with polarity that alternates in the circumferential direction. Moreover, the armature comprises a plurality of winding wires, each winding wire having two winding-wire sections which are arranged in the region of different magnet elements in such a manner that a first winding-wire section is assigned to a first magnet element and a second winding-wire section is assigned to a second magnet element which adjoins the first magnet element in the circumferential direction. Since the two magnet elements which follow one another in the circumferential direction have different polarities, it is necessary to configure the winding directions of the two winding-wire sections differently. To this end, for example, it can be gathered from FIGS. 19 and 21 of the document in question that the two winding-wire sections have an armature slot, in which the two winding-wire sections are arranged jointly. Since the magnet elements do not adjoin one another directly as viewed in the circumferential direction, but rather are separated from one another by way of a gap which runs in the longitudinal direction, relatively low-noise commutation with a satisfactory degree of efficiency results in practice in the case of a winding design of this type.

DISCLOSURE OF THE INVENTION

Proceeding from the described prior art, the invention is based on the object of developing a commutator motor in accordance with the preamble of claim 1 in such a way that an alternative embodiment of the commutator motor is achieved with satisfactory noise behaviour and a high degree of efficiency.

According to the invention, in a commutator motor having the characterizing features of claim 1, this object is achieved by virtue of the fact that the windings of the two winding-wire sections intersect in such a manner that the windings of the one winding-wire section are located in each case in an armature slot, which are located between the armature slots of the windings of the other winding-wire section.

In contrast to the prior art mentioned at the outset, no armature slot is therefore provided, in which the windings of the two winding-wire sections are arranged at the same time. Rather, an intersection of the two winding-wire sections takes place in such a way that, as viewed in the circumferential direction, there is an intersection of the two winding-wire sections, the intersection being formed at least by one armature tooth.

Advantageous developments of the commutator motor according to the invention are specified in the subclaims. All combinations comprising at least two of the features disclosed in the claims, the description and/or the figures fall within the scope of the invention.

It is provided in one particularly preferred structural embodiment that the armature slot of the one winding-wire section is located directly beside an armature slot of the other winding-wire section. In other words, this means that, as viewed in the circumferential direction of the armature, the intersection between the two winding-wire sections is configured to be as small as possible. As a result, the winding wire is optimized within the context of the available intersection variants, since the respective winding-wire section is assigned as far as possible to its respective magnet element and interacts with the latter.

Furthermore, it is provided, in particular, that between the armature slots of the one winding-wire section and the armature slots of the other winding-wire section in each case at least one additional armature slot is arranged.

Here, it can be provided, in particular, that the number of the additional or separating armature slots of the two winding-wire sections is different.

In a concrete embodiment or development of the last-mentioned proposal, it is provided that the armature has eighteen armature teeth, and that the one winding-wire section is arranged in two armature slots, which are separated from one another by three armature slots, as viewed in the circumferential direction of the armature, and that the other winding-wire section is arranged in two armature slots which are separated from one another by four armature slots as viewed in the circumferential direction of the armature. In the case of a four-pole motor with four magnet elements which have in each case the same circumferential length as viewed in the circumferential direction, this results in a relatively homogeneous arrangement or distribution of the winding-wire sections with respect to the magnet elements and, as a consequence, a relatively high degree of efficiency with satisfactory noise properties of the commutator motor.

It is likewise particularly preferably provided that the number of windings of each winding-wire section is at least substantially approximately the same, preferably is the same.

The invention also comprises a method for producing a commutator motor according to the invention, in which a winding-wire section of a winding wire is arranged in a first winding direction in two armature slots of an armature in a first winding step and subsequently another winding-wire section of the winding wire is arranged in a reverse winding direction compared to the first winding direction in two armature slots of the armature in a second winding step. It is provided according to the invention that the windings of the two winding-wire sections intersect as viewed in the circumferential direction of the armature slots in such a manner that after carrying out the first winding step the winding wire is introduced into an armature slot in order to carry out the second winding step, which armature slot is arranged between the armature slots of the first winding-wire section.

It is provided in one preferred embodiment of the method according to the invention that between the armature slots of the one winding-wire section and the armature slots of the other winding-wire section in each case at least one further armature slot is arranged, wherein the number of the further armature slots is different, and that in the first winding step, the winding-wire section is formed, which has the smaller number of separating armature slots. This method is particularly advantageous in that the greater the number of separating armature slots in one winding-wire section, the greater the tendency that the winding wire is guided or runs in the direction of the armature shaft during winding, which is to be considered disadvantageous for winding-specific and for physical reasons.

The invention also comprises a windscreen-wiper motor which has a commutator motor according to the invention, and a commutator which was produced in accordance with a method according to the invention.

Figure 2:
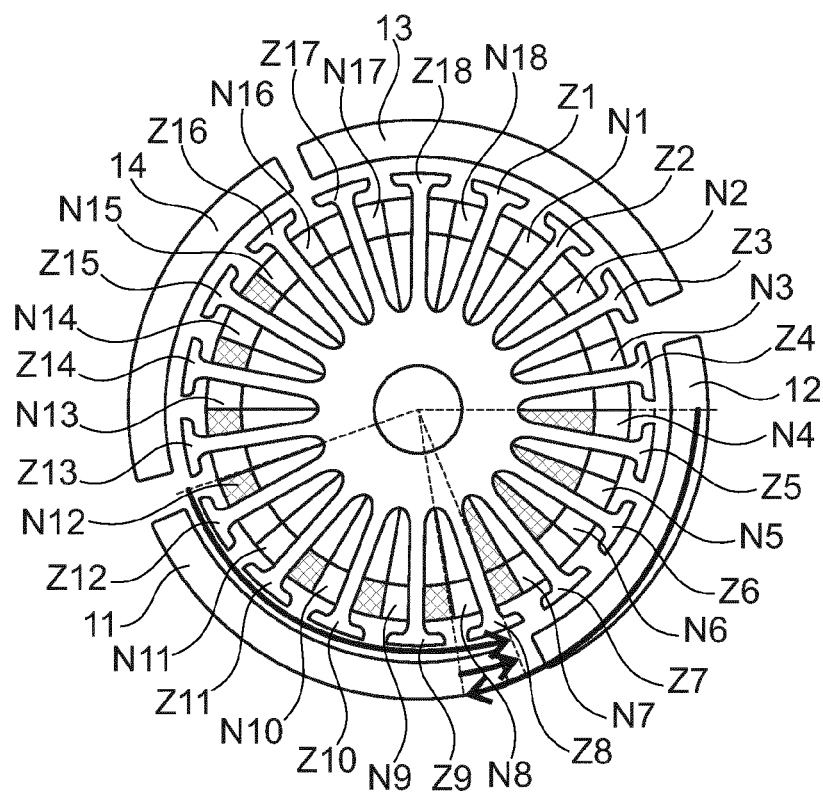
Figure 3:
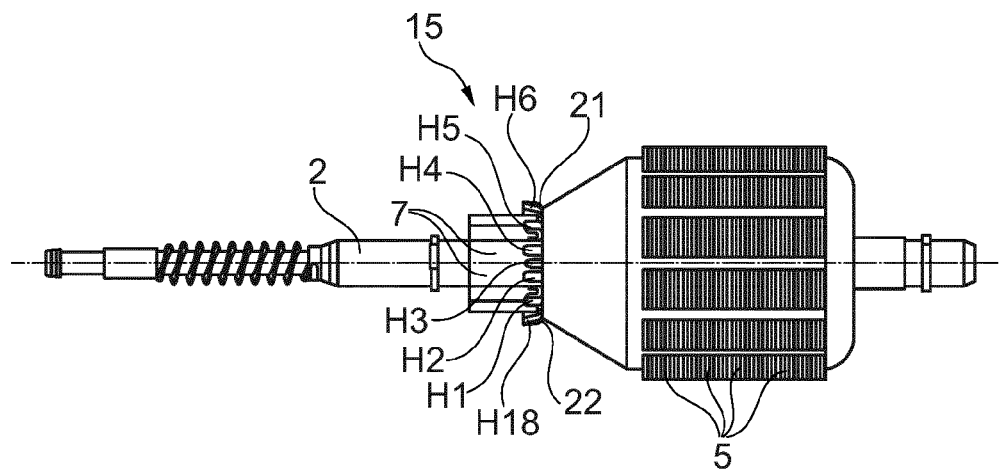
Figure 4:
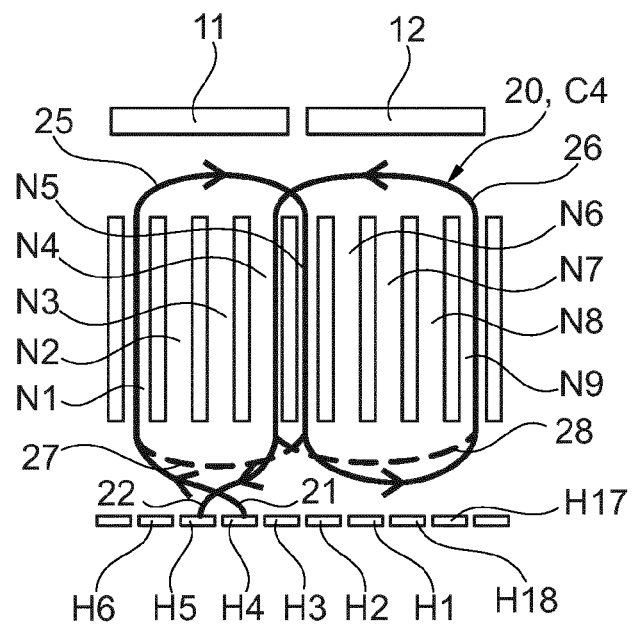

Further advantages, features and details of the invention result from the following description of preferred exemplary embodiments and using the drawing, in which:

FIG. 1 shows a longitudinal section through a commutator motor according to the invention in the form of a windscreen-wiper motor, FIG. 2 shows a cross section through the commutator motor according to FIG. 1 in the armature region, FIG. 3 shows an armature which is used in the commutator motor according to FIG. 1 in an individual illustration and in side view, and FIG. 4 shows a diagrammatic illustration for clarifying the winding design according to the invention in a commutator motor according to the invention.

Identical elements or elements with an identical function are provided with the same reference numerals in the figures.

FIG. 1 shows a commutator motor 10 according to the invention which serves as a constituent part in a windscreen-wiper motor 100. The commutator motor 10 is received within a housing 1 of the windscreen-wiper motor 100 and has an armature 15 with an armature shaft 2 which is mounted in a plurality of bearing devices 3, 4 within the housing 1. As can be seen, in particular, using FIG. 2, four permanent magnet elements 11, 12, 13, 14 are arranged by way of example within the housing 1 on its inner wall, between which permanent magnet elements 11, 12, 13, 14 gaps are formed which run in each case in the longitudinal direction and separate the permanent magnet elements 11, 12, 13, 14 from one another. The commutator motor 10 is therefore configured as what is known as a four-pole motor. Moreover, it is essential that the polarities of the four permanent magnet elements 11, 12, 13, 14 alternate in each case as viewed in the circumferential direction.

In a modification of the exemplary embodiment which is shown, it can also be provided that, instead of four permanent magnet elements 11, 12, 13, 14, an even greater number of permanent magnet elements are used, between which corresponding longitudinal slots or spaces are likewise configured in the longitudinal direction.

A multiplicity of armature plates 5 which are stacked above one another and are arranged flush with respect to one another are situated in a known manner on the armature 15. As can be seen, in particular, using FIG. 2, the armature plates 5 which are connected to one another, for example, by way of a baked varnish have eighteen armature teeth Z1 to Z18 which protrude radially to the outside at uniform angular spacings and eighteen armature slots N1 to N18 which are arranged between the armature teeth Z1 to Z18. The armature teeth Z1 to Z18 are widened in a T-shaped manner in a known way at their radially outer end region.

It can be seen from a combination of FIGS. 3 and 4 that, moreover, the armature 15 has a total of eighteen commutator hooks H1 to H18, of which not all commutator hooks H1 to H18 can be seen in FIGS. 2 and 4 on account of the illustration, however. The commutator hooks H1 to H18 are connected in an electrically conducting manner to coils C1 to C9 which are arranged in the armature slots N1 to N18, for example by way of a welded or brazed connection of the respective start 21 and end 22 of a winding wire 20 which forms the respective coil C1 to C9. Nine winding wires 20 are therefore provided to form the coils C1 to C9. The commutator hooks H1 to H18 are connected in an electrically conducting manner to current segments 7 which in turn interact with a brush device which, according to FIG. 1, has two brush elements B1, B2 in the form of carbon brushes which, by way of example but not restrictively, are arranged offset with respect to one another by 180°, and which are force-loaded against the current segments 7 by way of spring force.

The commutator motor 10 according to the invention is distinguished by a special winding type which will be explained in greater detail in the following text using FIGS. 2 and 4: it can be seen in FIG. 4, in particular, that a winding wire 20 which forms the coil C4 makes electrical contact with a start 21 (by way of example) on the commutator hook H4 and by way of its end 22 on the commutator hook H5. The winding wire 20 has two winding-wire sections 25, 26. Whereas the first winding-wire section 25 which is assigned to the permanent magnet element 11 has a winding direction which runs in the clockwise direction, the second winding-wire section 26 which is assigned to the permanent magnet element 12 is wound in a winding direction which runs counter to the clockwise direction. Moreover, it can be seen in FIGS. 2 and 4 that the first winding-wire section 25 is arranged in the armature slots N1 and N5, whereas the second winding-wire section 26 is arranged in the armature slots N4 and N9. Three separating armatures slots N2, N3 and N4 are arranged between the two armature slots N1 and N5 of the first winding-wire section 25, whereas four separating armature slots N5, N6, N7 and N8 are arranged between the two armature slots N4 and N9 of the second winding-wire section 26. It can therefore be gathered from the drawings, in particular, that the two winding-wire sections 25, 26 intersect as viewed in the circumferential direction.

Each of the two winding-wire sections 25, 26 has a multiplicity of windings 27, 28, the number of windings 27, 28 preferably being at least approximately identical.

The configuration of the coil C4 with the two winding-wire sections 25, 26 takes place by way of example in accordance with FIG. 4 by virtue of the fact that first of all the start 21 of the winding wire 20 is connected to the commutator hook H4. Subsequently, the first winding-wire section 25 is inserted with the windings 27 into the armature slots N1 and N5. Afterwards (that is to say, after the configuration of the required number of windings 27), the winding wire 20 is guided back into the armature slot N4 with a simultaneous reversal of rotational direction and arrangement of the windings 28 of the second winding-wire section 26 in the armature slots N4 and N9. After configuration of the required number of windings 28 of the second winding-wire section 26, the end 22 is connected to the commutator hook H5. The other coils C1 to C3 and C5 to C9 are introduced into the armature slots N1 to N18 according to the same winding design.

In a modification of the winding design which is shown and described, it can also be provided that first of all the windings 28 of that winding-wire section 26 which has the greater number of separating armature slots N1 to N18 are configured, and that subsequently, after corresponding guiding back of the winding wire 20, the other windings 27 or the other winding-wire section 25 are/is configured.

The commutator motor 10 which has been described up to now can be converted or modified in a wide variety of ways without deviating from the concept of the invention.

LIST OF REFERENCE NUMERALS

1 Housing
2 Armature shaft 3, 4 Bearing device
5 Armature plate
7 Current segment
10 Commutator motor
11 to 14 Permanent magnet element
15 Armature
20 Winding wire
21 Start
22 End
25, 26 Winding-wire section
27, 28 Winding
100 Windscreen-wiper motor
Z1 to Z18 Armature tooth
B1, B2 Brush element
N1 to N18 Armature slot
H1 to H18 Commutator hook
C1 to C9 Coil

The invention claimed is:

1. A commutator motor that is part of a windscreen-wiper motor, the commutator motor comprising:
   at least four magnet elements which are arranged on a reference-circle diameter around an axis of rotation of an armature shaft with polarity that alternates in the circumferential direction; and
   an armature with armature slots and armature teeth,
   wherein winding wires having a multiplicity of windings in each case for constructing coils are arranged in the armature slots,
   wherein a start and an end of a winding wire is electrically conductively connected to a commutator hook in each case,
   wherein a winding wire has two winding wire sections, which are arranged in the region of different magnet elements s that a first winding wire section with a first number of windings in a first winding direction is assigned to a first magnet element and is located in a first set of two armature slots, and that a second winding wire section with a second number of windings in a second winding direction, opposite to the first winding direction, is assigned to a second magnet element and is located in a second set of two armature slots,
   wherein the first and second magnet elements have different polarities, and
   wherein the windings of the two winding wire sections intersect so that the windings of the first winding-wire section are located in an armature slot, which is located between the second set of two armature slots of the windings of the second winding-wire section.

2. The commutator motor according to claim 1, wherein the armature slot of the first winding-wire section is located directly beside an armature slot of the second winding-wire section.

3. The commutator motor according to claim 2, wherein between the armature slot of the first winding-wire section and the armature slot of the second winding-wire section at least one additional armature slot is arranged.

4. The commutator motor according to claim 1, wherein the number of the armature slots of the two winding-wire sections is different.

5. The commutator motor according to claim 4, wherein the armature has eighteen armature teeth, and the first winding-wire section is arranged in the first set of two armature slots, which are separated from one another by three armature slots, as viewed in the circumferential direction of the armature, and wherein the second winding-wire section is arranged in the second set of two armature slots, which are separated from one another by four armature slots, as viewed in the circumferential direction of the armature.

6. The commutator motor according to claim 1, wherein the number of windings of the two winding-wire sections is at least substantially the same.

7. A method for producing a commutator motor according to claim 1, comprising:
   arranging a winding-wire section of a winding wire in a first winding direction in the first set of two armature slots of an armature in a first winding step; and
   subsequently, arranging another winding-wire section of the winding wire in a reverse direction compared to the first winding direction in the second set of two armature slots of the armature in a second winding step,
   wherein the windings of the two winding-wire sections intersect as viewed in the circumferential direction of the first and second sets of armature slots in such a manner that after carrying out the first winding step the winding wire is introduced into a third armature slot to carry out the second winding step, wherein the armature slot is arranged between the first set of two armature slots of the first winding-wire section.

8. The method according to claim 7, wherein between the one armature slot of the first set of armature slots of the one winding-wire section and the one armature slot of the second set of armature slots of the other winding-wire section at least one further armature slot is arranged, wherein the number of the armature slots of the two winding-wire sections is different, and wherein in the first winding step, the winding-wire section is formed with a smaller number of separating armature slots.

9. A windscreen-wiper motor comprising a commutator motor according to claim 1.

* * * * *